May 26, 1964  H. W. BOTELER  3,134,571
DIAPHRAGM ASSEMBLY FOR DIAPHRAGM VALVES
Filed May 5, 1961  4 Sheets-Sheet 1

INVENTOR.
HENRY W. BOTELER
BY Martin D. Wittstein
ATTORNEY

May 26, 1964 H. W. BOTELER 3,134,571
DIAPHRAGM ASSEMBLY FOR DIAPHRAGM VALVES
Filed May 5, 1961 4 Sheets-Sheet 2

*INVENTOR.*
HENRY W. BOTELER
BY Martin D. Wittstein
ATTORNEY

May 26, 1964   H. W. BOTELER   3,134,571
DIAPHRAGM ASSEMBLY FOR DIAPHRAGM VALVES
Filed May 5, 1961   4 Sheets-Sheet 4

INVENTOR.
HENRY W. BOTELER
BY Martin D. Wittstein
ATTORNEY

United States Patent Office 3,134,571
Patented May 26, 1964

3,134,571
DIAPHRAGM ASSEMBLY FOR DIAPHRAGM VALVES
Henry W. Boteler, East Greenwich, R.I., assignor to Grinnell Corporation, Providence, R.I., a corporation of Delaware
Filed May 5, 1961, Ser. No. 107,953
8 Claims. (Cl. 251—331)

This invention relates to improvements in valve diaphragms. More particularly it has to do with an improved arrangement for securing a connecting device to the imperforate layer of diaphragm material which is exposed to the fluid controlled by the valve. This layer may comprise the entire diaphragm or a portion thereof.

The device of this invention is an important component of that class of valves known as diaphragm valves. Such valves are particularly suited to those situations where it is desired to keep the valve operating parts separate from the fluid being controlled by the valve and thereby protect these parts and prevent contamination of the fluid.

Briefly a valve of this character consists of a body having a flow passageway therethrough with a side opening communicating with the passageway and a seating in the body presented toward the opening. The diaphragm has its periphery sealingly clamped to the body around the opening by a bonnet housing an actuating mechanism which flexes the central diaphragm portion toward the seating and presses it thereagainst to close the valve, and similarly withdraws the central diaphragm portion from the seating to open the valve.

In recent years there has been an increasing demand for valves of this type capable of controlling corrosive fluids. As far as the valve body is concerned this demand has not presented very difficult problems because it is possible to form the rigid body of corrosion resistant materials or line the passageway surfaces with such materials. However, the provision of suitable diaphragm materials for such corrosive service has been more of a problem because of the necessity for the diaphragm central portion to flex substantially during valve operation and to be resilient enough to achieve a fluid-tight seal when pressed against the rigid body seating.

Among the diaphragm materials thus far employed, one of the most popular is polytetrafluoroethylene because of its high corrosion resistance and because it can be made sufficiently flexible to be used as a valve diaphragm. It does have several serious limitations, however, in that it is not very resilient and it is very expensive when formed in unusual shapes by molding.

In the past the difficulties in obtaining a fluid-tight seal between a polytetrafluoroethylene diaphragm and the rigid valve body seating have been quite successfully overcome by making the polytetrafluoroethylene diaphragm relatively thin (which incidentally makes it more flexible) and by using therewith a very resilient backing sheet or backing cushion between the diaphragm actuating mechanism (compressor) and the polytetrafluoroethylene diaphragm. The result of this combination is that the relatively non-resilient diaphragm is pressed against the seating by force transmitted through the more resilient backing sheet, and accordingly the diaphragm conforms to any irregularities on the seating without being cut or abraded by the compressor.

A difficulty which has not been overcome in some of the prior proposals employing polytetrafluoroethylene diaphragms and backing sheets as described is the expense involved in molding these diaphragms to make provision for the necessary attachment of the central diaphragm portion to the actuating mechanism so that the diaphragm will be positively withdrawn from the seating in the opening of the valve. Thus in one prior proposal this attachment has involved embedding the head of a stud in the polytetrafluoroethylene diaphragm at the center thereof and which has been accomplished by molding the diaphragm from powder form into the desired shape and around such stud head.

As those skilled in this art will appreciate molding polyetrafluoroethylene powder into a diaphragm which has the ability to withstand repeated flexing and remain impervious is an expensive procedure, and accordingly there has been more recently proposed an arrangement for diaphragm valve diaphragms in which the polytetrafluoroethylene is formed from the relatively inexpensive skived or molded sheet, commercially available, and in which such a sheet is bonded to the rubber or rubber-like backing cushion in order to provide the required positive withdrawal of the polytetrafluoroethylene sheet from the seating during valve opening. In that arrangement the backing cushion has a stud or similar member embedded in it and extending from it for connection with the compressor.

One difficulty with this bonded construction is that because of the dissimilar flexing characteristics of the polytetrafluoroethylene diaphragm and the rubber or rubber-like backing cushion a severe strain is imposed on the bond and rupture of the bond is likely to take place after a modest number of valve operations. To minimize the difference in these characteristics it has become the practice to make the polytetrafluoroethylene-sheet as thin as possible and still remain impervious to the fluid being controlled. However, in thus minimizing these differences by having the thin polytetrafluoroethylene sheet conform to and not substantially interfere with the flexing characteristics of the backing cushion it is found that the diaphragm sheet is thin enough to wrinkle considerably with the result that the polytetrafluoroethylene is bent quite sharply at the wrinkles and cracks are likely to appear causing leakage after a relatively small number of flexures.

The present invention overcomes the above difficulties of the prior proposals by providing a combination of plastic diaphragm and rubber or rubber-like backing cushion in which the diaphragm is formed from a layer of plastic of substantially uniform thickness to at least a portion of which a connecting member is secured independently of the backing cushion and in which the connection member is exterior of the material of the layer.

For example, in one embodiment of the present invention the diaphragm is formed from a thin sheet of polytetrafluoroethylene which is initially a relatively inexpensive skived sheet of this material and which can be molded into a layer having the desired diaphragm shape in a simple operation. This diaphragm layer thus formed has bonded to its back surface the surface of the head of a metal stud which has a shank adapted to extend through an opening in a rubber or rubber-like backing cushion and to be secured to the actuating mechanism with a lost-motion connection.

From this embodiment it will be seen that the expense of embedding a portion of the connecting member in the diaphragm layer which is presented to the fluid is avoided and at the same time the bonding of the diaphragm to the backing cushion may also be done away with thereby avoiding the problems caused by the different flexing characteristics of a bonded diaphragm and backing cushion. More particularly since such a bond between diaphragm and backing cushion can be avoided it is no longer necessary to limit the diaphragm thickness out of consideration for maintaining such bond during flexing, and in the present invention the diaphragm thickness can be that which provides maximum imperviousness commensurate with ease of valve operation.

Accordingly, it is one object of the present invention to provide a diaphragm valve diaphragm and backing cushion combination in which a connecting device is secured to the surface of a substantially uniformly thick diaphragm layer independent of the backing cushion.

Another object of the invention is to provide such a combination in which the connecting device comprises a metal stud having a surface adhered to the layer surface.

Another object is to provide such a combination in which the connecting device comprises a stud of one material, preferably metal, having a surface adhered to a body of a different material, preferably plastic, separate from the backing cushion and in which this body of different material is adhered to the diaphragm layer.

Another object is to provide such a combination in which the connecting device comprises a stud of one material, preferably metal, having one portion captured by a layer of fabric or similar material which is separate from the backing cushion and in which this layer of fabric is adhered to the diaphragm layer.

Another object is to provide such a combination in which the connecting device comprises a stud of one material having one portion embedded in a body of different material which is separate from the backing cushion and which includes a layer substantially coextensive with the diaphragm layer and adhered thereto.

Another object of the invention is to provide such a combination in which the connecting device comprises a block or body of the same or similar material as that of the diaphragm and bonded thereto, the block or body being provided with means for attaching it to the valve actuating mechanism.

Another object is to provide an improved diaphragm construction which is simple in design, inexpensive to manufacture and readily installed and replaced.

The best mode in which I have contemplated applying the principles of my improvements is shown in the accompanying drawings, but these are to be deemed merely illustrative for it is intended that the patent shall cover by suitable expression in the appended claims whatever features of patentable novelty reside in the invention disclosed.

Figures 1, 2:
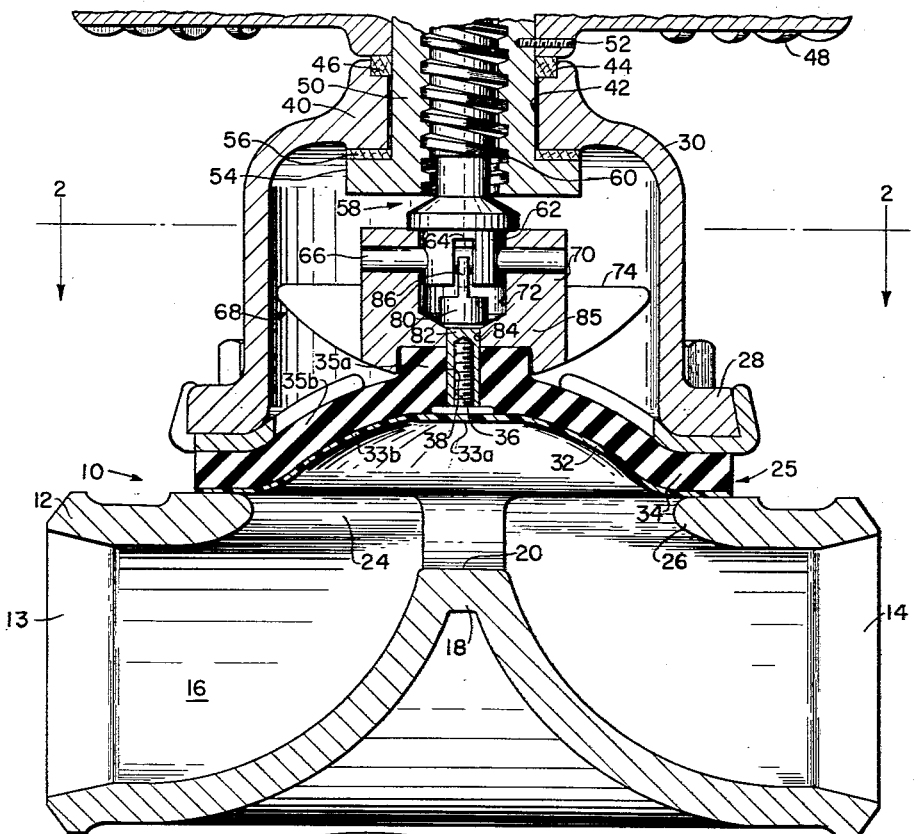
FIGURE 1 is a vertical sectional view along the line 1—1 of FIG. 2 through a diaphragm valve of the type in which this invention can be employed.
FIGURE 2 is a horizontal sectional view along the line 2—2 of FIG. 1.

Referring now to FIGS. 1 and 2, a diaphragm valve of the type to which this invention appertains is generally designated by the numeral 10. The valve 10 is seen to comprise a generally tubular shaped valve body 12 which is open at its ends 13 and 14 and which defines a generally longitudinal flow passageway 16 therethrough. The ends 13 and 14 of the body 12 are adapted to be connected by suitable means to a pipe or other conduit through which liquid flows, the body 12 thereby forming an integral part of the fluid conduit. Approximately midway between ends 13 and 14, body 12 is deformed inwardly as shown in FIG. 1 to form a weir 18 over which fluid flowing through the valve body must pass. The inner surface of weir 18 forms a seating 20 adapted to receive in forced engagement therewith the central portion of a diaphragm or sealing member 32 to be fully described hereinafter. In this manner the valve is closed to effectively block the flow of fluid over the weir 18.

A portion of the valve body 12 opposite that portion which is deformed to form weir 18 is cut away to provide a side opening 24 which communicates with and is at right angles to the passageway 16. Opening 24 is adapted to be covered by a diaphragm and backing cushion combination 25, the peripheral portion of which rests on a flange 26 surrounding the opening. The diaphragm and backing cushion combination 25 is secured in place by being clamped between the flange 26 and a corresponding flange 28 of a housing or bonnet 30, which is bolted or otherwise attached to the body 12. It will be seen that opening 24 is thus completely closed by the diaphragm and backing cushion combination so that no fluid can pass therethrough to the interior of bonnet 30. This serves to protect actuating parts within the bonnet from any undesirable effects of the fluid in the line and also to prevent any possible contamination of the fluid.

Figure 3:
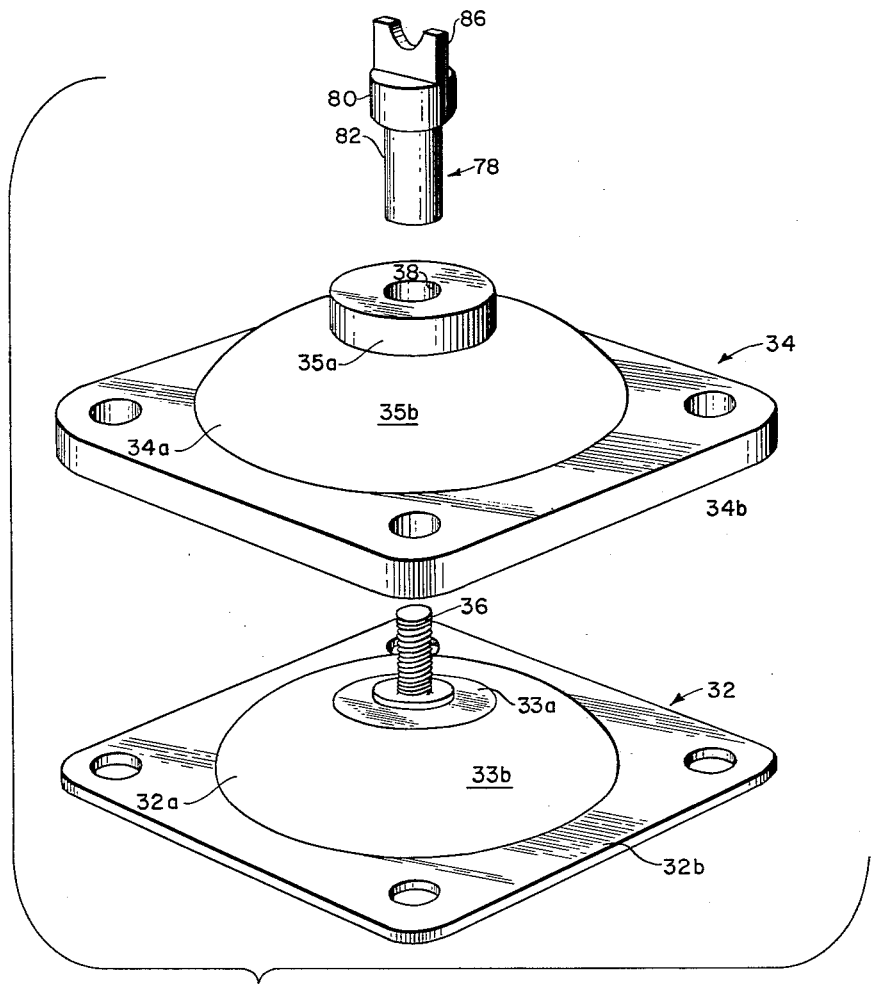
FIGURE 3 is an isometric exploded view illustrating the manner of assembly of the diaphragm and backing cushion combination with the attachment member secured to the diaphragm.

The aforementioned diaphragm and backing cushion combination 25 comprises a plastic diaphragm 32 which is desirably formed of polytetrafluoroethylene, and a resilient backing cushion 34 of rubber or rubber-like material. The diaphragm and backing cushion combination has a central dished portion 32a and 34a respectively as shown in FIG. 3 which is adapted to be flexed by the actuating parts contained within the bonnet 30. Surrounding the central dished portion 32a and 34a, the diaphragm and backing cushion have a peripheral flat portion 32b and 34b respectively which portion may be squared off as shown in FIG. 3 to provide space thereon for bolt holes to facilitate attaching the diaphragm and backing cushion combination to the valve body.

It may be seen from any of the FIGURES 1, 5, 6, 7, 8 and 9 that the central dished portion 32a of the diaphragm may, for purposes of greater clarity, be further divided into a first movable central portion 33a which underlies a stud head (to be fully described hereinafter) and a second movable portion 33b which lies between the peripheral portion 32b and the first movable central portion 33a, and which is adapted to flex during valve operation. Similarly, the central dished portion 34a of the resilient backing cushion may be further divided into a first movable central portion 35a which overlies the stud head and has an opening 38 therein for reception for a stud shank, and a second movable portion 35b which lies between the peripheral portion 34b and the first central portion 35a and which is adapted to flex during valve operation.

The diaphragm 32 and backing cushion 34 are separate members, as seen in FIG. 3, and are shaped to conform with each other, and may be contiguous over a substantial area. In all cases, however, there is an area at least over the first central portion and in some cases therebeyond where the backing cushion must be shaped to conform to the diaphragm plus the means for connecting the diaphragm to the actuating mechanism. Thus the backing cushion fits snugly over the diaphragm and the diaphragm connecting means when the backing cushion and diaphragm are assembled together in face to face relationship.

A stud 36 (or 36'; note FIGS. 11 and 12) is suitably secured to the surface of the dished portion 32a of the diaphragm, at the center 33a thereof, the stud having a threaded (or similarly formed) shank which passes through the opening 38 in the backing cushion 34 and is thence adapted to be connected to the valve actuating parts. This stud may be of metal or any other desirable strong material including the material from which the diaphragm is made.

The valve actuating parts form a mechanism which is housed within the bonnet 30 and is arranged to open and close the valve in response to movement of an external actuator. Centrally located on the top of the bonnet 30 is a boss 40 with a bore 42 therethrough terminating outwardly in a recessed seat 44. A washer 46 is received within the seat 44 and acts as a bearing surface for a handwheel 48 with which the valve is operated. The handwheel 48 is rigidly secured to an internally threaded sleeve 50 by means of a pin 52 or other suitable structure. The sleeve 50 is rotatably mounted in the bore 42 and is constrained against withdrawal thereform by a flange 54 which engages the underside of the boss 40 through a thrust washer 56. Thus it will readily be seen that any rotation of the handwheel 48 will be imparted to the sleeve 50.

Figure 4:
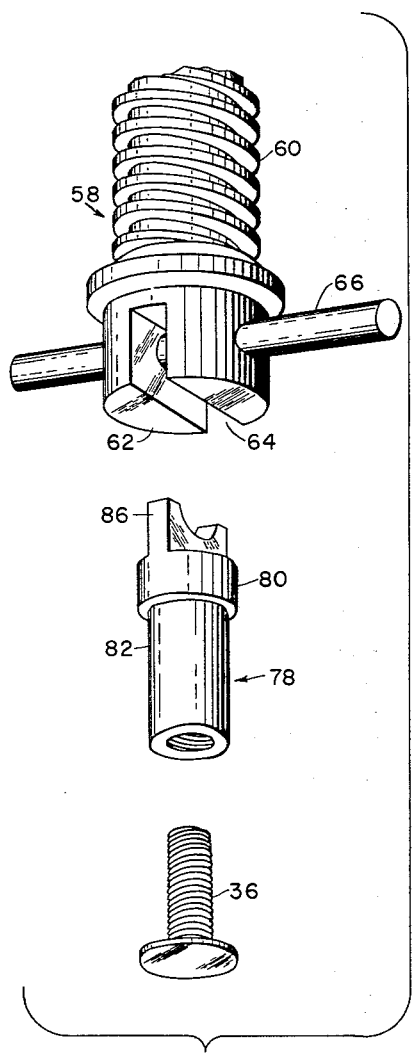
FIGURE 4 is an isometric exploded view of a lost motion coupling between the driving spindle and the diaphragm attachment member.

The valve actuating mechanism further includes a spindle generally designated 58 having a threaded shank 60 and a bifurcated head 62, the projections of which define therebetween a groove 64 as best seen in FIG. 4. The threaded shank is received within the interior of the sleeve with the bifurcated head 62 projecting from the bottom thereof. Suitably secured to the bifurcated head 62 of the spindle 58 is a driving member or compressor generally designated by the numeral 68. In the illustrated embodiment the compressor 68 is secured to the spindle 58 by a pin 66 which is passed through an opening in a central boss 70 of the compressor and thence through an opening in the bifurcated head 62. Boss 70 of compressor 68 is hollowed out as at 72 to receive the projections of the bifurcated head for a purpose to be explained hereinafter.

The compressor 68 includes a plurality of radial fingers 74 which are adapted to press against the upper surface of the backing cushion central portion 34a when the compressor is caused to move downwardly. Referring particularly to FIG. 2, it will be seen that two of the fingers 74a and 74b project outwardly beyond the circumference defined by the remaining fingers 74, and are received in vertical grooves 76 formed in the wall of the bonnet 30. In this manner, the grooves 76 serve as guide-ways for the fingers 74a and 74b when the latter move up and down; thus the compressor is constrained against rotational movement with respect to the bonnet 30. The connecting pin 66 will in turn act to constrain the spindle 58 against rotational movement with respect to the bonnet 30.

Again referring to FIG. 1, the compressor 68 is fastened to the diaphragm by a tube nut 78 (FIG. 4) having a head 80 which is received in the lower part of the hollowed out portion 72 of the compressor central boss 70. An internally threaded shank 82 passes through a bore 84 formed by an inwardly extending flange 85 at the bottom of the hollowed out portion 72 in the central boss 70, and is received in the bore 38 of the backing cushion 34 as clearly seen in FIG. 1. It will be noted from FIGS. 1, 3 and 4 that the head 80 of tube nut 78 has a wing 86 integral therewith which is received in the groove 64 of the bifurcated head 62 of spindle 58. Thus the tube nut is prevented from rotating relative to the compressor 68 and bonnet 30. By inserting the threaded shank of stud 36 into the interior of tube nut 78 and then rotating the diaphragm 32 relative to the bonnet 30 until the lower end of the tube nut rests firmly on the upper surface of the stud head, the diaphragm and backing cushion combination will be securely fastened to the compressor, and the backing cushion will be held in engagement with the underside of the compressor.

An advantageous feature of the above described construction is the lost motion between the compressor and the diaphragm which prevents the closing force exerted by the compressor from being applied directly to the stud, but permits it to be applied to the diaphragm through the resilient backing cushion. However, the connecting structure permits the opening or withdrawing force which is exerted by the compressor on the plastic diaphragm thus insuring its positive withdrawal from the weir. Thus in FIG. 1 it will be noted that there is a space between the underside of the bifurcated head 62 of the spindle 58 and the upper surface of the head 80 of tube nut 78. Since the spindle is connected to the compressor through the pin 66, the closing force of the spindle is transmitted directly to the compressor and thence through the resilient backing sheet to the diaphragm. No driving force is applied directly to the tube nut; therefore, there is no direct force applied to the stud which might otherwise tend to force the head of the stud through the diaphragm. As the compressor moves downwardly after initial contact between the diaphragm and the weir, the resilient backing cushion is compressed to assure a tight seal between the diaphragm and the weir. This final downward movement of the compressor is permitted by the aforementioned space. It will be further noted, however, that the flange 85 of the compressor central boss 70 bears directly against the underside of the head 80 of tube nut 78. Therefore, when the spindle applies a withdrawing force on the compressor, this force will be transmitted directly to the diaphragm through the tube nut and stud, thereby assuring a positive withdrawal of the diaphragm from the weir.

From the foregoing description, the operation of the device will be apparent. Assuming the parts to be in the positions as shown in FIG. 1 and that it is desired to close the valve, rotation of the handwheel 48 will cause a corresponding rotation of the sleeve 50 within the bore 42 of bonnet 30. Rotation of the sleeve 50 will cause a reciprocatory movement of the spindle 58 because of the interaction of the threads on the interior of the sleeve and the exterior of the spindle. As the spindle moves inwardly toward the valve body, the pin 66 forces the compressor to move inwardly which in turn forces the diaphragm and backing cushion combination to flex inwardly in the area of the second movable portion 33a and 35a and ultimately engage the seating surface 20 of the weir 18 with sufficient pressure to assure a tight and leak-proof seal.

When it is desired to open the valve, the handwheel 48 is rotated in such direction as to draw the spindle 58 outwardly away from the valve body 12. The spindle, acting through the pin 66 applies a withdrawing force to the compressor which force is transmitted to the head 80 of the tube nut 78 by the flange 85, and thence to the diaphragm through the threaded connection between the tube nut and the stud 36. It will be seen therefore that the withdrawing force is applied directly to the diaphragm to assure a positive withdrawal and reflexing of the diaphragm to its initial position shown in FIG. 1.

It will be appreciated from the foregoing description of the operation of the valve that the manner of securing the head of stud 36 to the diaphragm 32 is an important feature in the design, construction and operation of the valve. The present invention seeks to overcome the difficulties of the prior art solutions, particularly those difficulties inherent in molding the stud into a diaphragm or bonding an entire diaphragm to a backing cushion.

The manner of attachment of the diaphragm to the valve actuating mechanism may be considered to comprise two members or parts, one of which is secured to the diaphragm and the other of which passes through an opening in the backing cushion and is secured to the actuating mechanism. In one embodiment, the first part is merely the head of the stud 36; in other embodiments, the first member or part includes the stud head and additional holding structure surrounding the stud head, at least in part, as more fully set forth hereinbelow. The second part will usually be merely the shank of the stud.

Referring again to FIGS. 1 and 3, it will be seen that the surface of the head of the stud 36 is bonded directly to the diaphragm 32. In this embodiment, the stud is preferably made of metal. It should be noted at this point that bonding, as used in this specification, includes cementing, as well as the mere alteration of the two surfaces so that they will stick together for example, by the application of heat and pressure. By so bonding the stud head directly to the diaphragm and passing the shank of the stud through the rubber backing cushion, it will be readily appreciated that a low cost flat sheet of plastic may be used since no molding with the stud is required, and it is not necessary to bond the diaphragm to the backing cushion because the stud is secured directly to the diaphragm and not merely to the backing cushion. The advantage of not bonding the diaphragm to the backing cushion is that the wrinkling encountered with a bonded construction is avoided. This wrinkling is caused by the plastic diaphragm and rubber backing sheet having different bending characteristics tending to cause some slippage of one surface relative to the other during bending. The bonding prevents the slippage thereby resulting in wrinkling of the diaphragm. Of course, this wrinkling is undesirable because it tends to weaken the plastic in the area of the wrinkle and make it subject to cracking.

Figure 5:
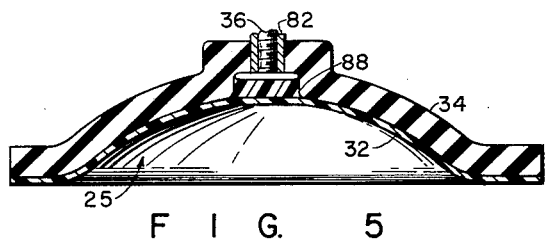

FIG. 5 illustrates another embodiment of the invention wherein the head of the stud is bonded to a relatively small piece of resilient material 88, for example, of natural or synthetic rubber or resilient plastic, which piece of material is then bonded to the plastic diaphragm. This type of construction is advantageous in those situations where it is found difficult to bond the stud head directly to the polytetrafluoroethylene diaphragm because of the characteristics either of the metal or of the plastic. Another advantage of this construction is that if the washer-like member 88 is made sufficiently thick, the lost motion connection between the compressor and the diaphragm may be eliminated and the stud 36 connected directly to the compressor. Under this construction, the washer-like member 88 would absorb the pressing force of the compressor that is required to maintain the diaphragm in leak-proof engagement with the seating 20.

Figure 6:
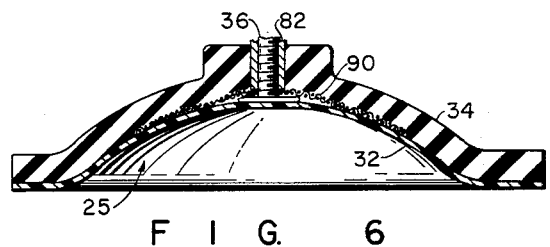

Still another embodiment of the present invention is shown in FIG. 6 wherein a layer of fabric 90 or other woven or mesh type material is placed over the stud head and is then bonded to the diaphragm surface and the stud head, after the shank of the stud is passed through a suitable opening in the fabric layer. Thus the stud is secured to the diaphragm by means of the fabric rather than by direct bonding of the stud head. One advantage of this modification lies in the flexibility retained in the diaphragm in the area of the stud head which flexibility facilitates flexing of the diaphragm from one position to the other. This flexibility of the diaphragm in the area of the stud head is lost when the plastic is bonded directly to the metal. While the area of bond between the fabric and the diaphragm is usually sufficient to give all the pulling ability needed to flex the diaphragm properly, the stud head may be bonded to the diaphragm if still more pulling ability is desired, for example, on a vacuum line, but such ability is at the expense of flexibility of the diaphragm in the area of the stud head.

Figure 9:
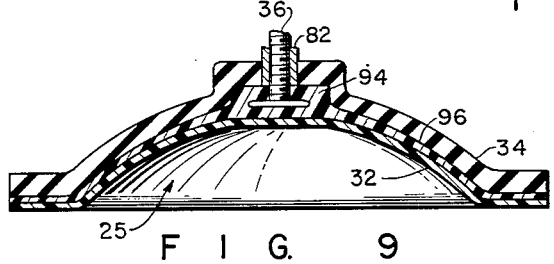
Figure 7:
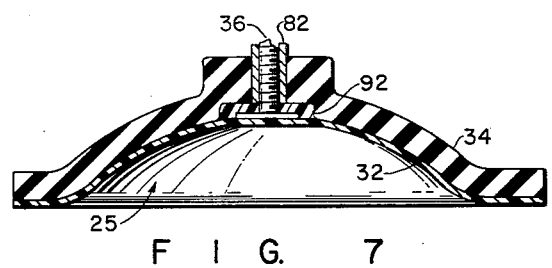
Figure 7A:
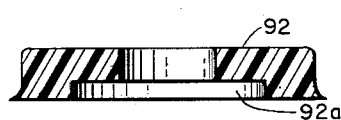

If desired, the fabric 90 may be replaced with a washer-like piece of plastic, hard rubber or other suitable material such as shown in FIGS. 7 and 7A at 92. Such a member can be preformed apart from the stud or diaphragm, assembled with the stud and then bonded to the diaphragm with the stud head captured therein. The member 92 can usually be machined to form a counter-bored recess 92a as seen in FIG. 7a to fit over the stud head; this procedure facilitates mass production of the diaphragm assembly and thereby reduces cost. Another advantage of this procedure is that the diaphragm is not rigidified by the addition of another layer of material, whether that material is fabric or another layer of plastic as seen in FIG. 9. The result of this is that a smaller pressure is needed to flex the diaphragm from one extreme position to another.

Figure 8:
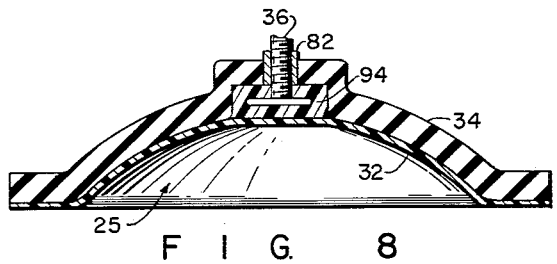
FIGURES 5–12 are vertical sectional views of several embodiments of invention, FIG. 11 also showing a modified compressor connection.

It may in some instances be desirable to have the stud head imbedded in a piece of material and not contacting the diaphragm; in such case, the embodiments illustrated in FIGS. 8 and 9 will facilitate such desire. In FIG. 8, the stud head is completely captured in a block 94 of plastic or other suitable material which can readily be bonded to the diaphragm material. If, however, it should be found that additional strength is required than can be obtained over the area of the block 94, an integral peripheral layer or skirt portion 96 of the same material may be molded with the block 94 to increase the bonding area appreciably, as seen in FIG. 9. As with the embodiment of FIG. 5, if the material for the block 94 is sufficiently resilient and thick, it may be possible to again eliminate the lost motion connection between the compressor and the diaphragm, and connect the same directly together, without fear of forcing the stud head through the diaphragm upon the application of the required closing pressure.

Figure 10:
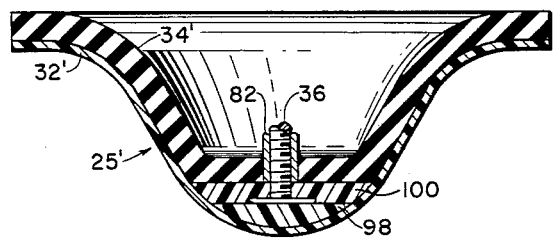

FIGURE 10 illustrates the principles of this invention applied to a diaphragm and backing cushion combination 25' which is shaped in accordance with the requirements of that type of diaphragm valve known as the straightway diaphragm valve, the entire body of which is not illustrated. In this type of valve, there is no weir which projects inwardly from one surface of the valve body to interrupt the smooth flow of liquid therethrough. On the contrary, the valve body is so shaped that the body is, on one side of its interior surface, an uninterrupted continuation of the conduit leading into the body, and is widened out beyond the limits or diameter of the lead in conduit toward the side opposite that which is continuous with the lead in conduit. Thus, the diaphragm must be shaped as shown in FIG. 10 to extend from one side of the valve body where it is clamped to the opposite side thereof where it will seat against a seating surface to block the passage of liquids therethrough, this distance being at least as great as the diameter of the lead in conduit to permit the maximum amount of flow through the valve.

Because the valve seating surface is tangent to the curvature of the lead in pipe over a given arc, and since the diaphragm must conform to this configuration, a flat stud head cannot be secured directly to the diaphragm layer. Therefore a suitable support in the form of a shaped block of resilient material as seen at 98 in FIG. 10 is first inserted into the bottom well portion of the diaphragm and is bonded thereto. The stud 36 is placed on this block of material and is bonded thereto or not as desired. A washer-like retaining member 100, having an opening through the center and a recess in one surface for the stud head, is placed in position over the stud and bonded to the support member 98. Thus the stud is secured to the diaphragm to flex it in response to actuation of the actuating mechanism.

It should be noted that if the supporting block 98 is made sufficiently thick and resilient the lost motion construction described hereinabove may be eliminated without damage to the diaphragm and the valve structure thus simplified.

Figure 11:
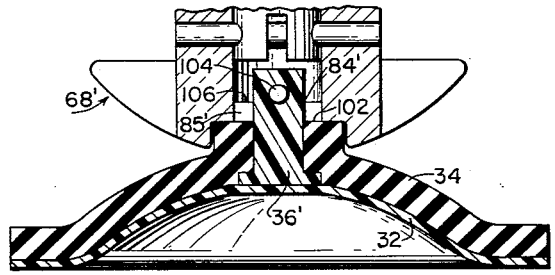

It may in some situations be desirable to make the connecting device entirely of the same or similar material as that of the diaphragm. Accordingly, FIG. 11 illustrates an embodiment wherein the connecting member is a stud 36' of the same material as that of the diaphragm or, if desired, of a very similar material which can easily be bonded to the diaphragm 32. It will be recognized that a plastic stud cannot be threaded so as to have the same holding ability as a metal stud; hence a more desirable means of attaching the stud to the compressor is illustrated in FIG. 11. The compressor 68' has been modified somewhat from that shown in FIG. 1 by having a larger opening 84' to accommodate the thicker stud 36'. Also the tube nut assembly 78 has been eliminated. The compressor 68' has a slot 102 which extends on opposite sides of the opening 84' so that a pin 104 inserted into the stud 36 or formed integrally therewith can pass through the slot 102 into the interior of the compressor. The assembly is held together by turning the diaphragm through a 90° arc so that the pin will rest on a ledge or shelf 106 formed by the inwardly projecting flange 85' corresponding to the flange 85 in the compressor of FIG. 1. Thus the diaphragm is secured to the compressor and the lost motion connection is maintained since the pin is free to move within the interior of the compressor.

Figure 12:
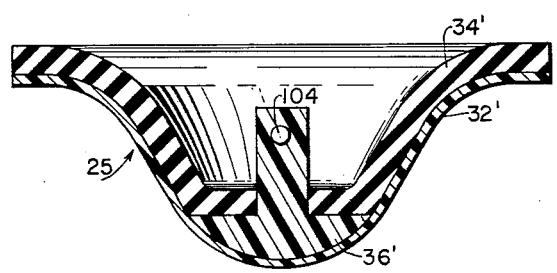

FIG. 12 illustrates the stud 36' of the same or similar material as the diaphragm applied to the straightway valve type diaphragm. Since the stud 36' can be molded or machined to substantially the desired shape, the stud head is shaped to fit the diaphragm configuration; hence no retaining member is needed as in the FIG. 10 embodiment.

I claim:
1. A diaphragm assembly for a valve having an actuating mechanism, said assembly comprising:
   (A) a thin imperforate plastic facing sheet adapted to withstand exposure to many fluids, said facing sheet being of uniform thickness throughout and including:
      (1) a normally substantially concavo-convex central portion having a substantially flat center portion,
      (2) a peripheral flat portion integral with the outer rim of said central portion and adapted to be clamped,
   (B) a resilient elastomer backing cushion sheet being relatively much thicker than said facing sheet and of substantially uniform thickness and including:
      (1) A normally substantially concavo-convex central portion,
      (2) a peripheral flat portion integral with the outer rim of said central portion and adapted to be clamped with the peripheral portion of said facing sheet,
      (3) a raised substantially centrally located boss on the convex surface of said backing cushion and integral therewith,
      (4) said backing cushion sheet being in juxtaposed and independent relation with the convex surface of the central portion of said facing sheet and the corresponding surface of the peripheral portion of said facing sheet,
   (C) a stud construction adapted to connect said diaphragm assembly to said actuating mechanism, said stud construction including:
      (1) A flat head,
      (2) a threaded shank integral with said head and extending through a hole in said boss,
      (3) means joining said head to the substantially flat center portion of the convex portion of said facing sheet.

2. An assembly according to claim 1 wherein the means joining said head to the substantially flat center portion of the convex portion of said facing sheet is a block of elastomer material bonded to the substantially flat center portion of said facing sheet and to which the flat head is bonded.

3. A diaphragm assembly for a valve having an actuating mechanism, said assembly comprising:
   (A) a thin imperforate plastic facing sheet adapted to withstand exposure to many fluids, said facing sheet being of uniform thickness throughout and including:
      (1) a normally substantially concavo-convex central portion, having a substantially flat center portion,
      (2) a peripheral flat portion integral with the outer rim of said central portion and adapted to be clamped,
   (B) a resilient elastomer backing cushion sheet being relatively much thicker than said facing sheet and of substantially uniform thickness and including:
      (1) a normally substantially concavo-convex central portion,
      (2) a peripheral flat portion integral with the outer rim of said central portion and adapted to be clamped with the peripheral portion of said facing sheet,
      (3) a raised substantially centrally located boss on the convex surface of said backing cushion and integral therewith,
      (4) said backing cushion sheet being in juxtaposed and independent relation with the convex surface of the central portion of said facing sheet and the corresponding surface of the peripheral portion of said facing sheet,
   (C) a stud adapted to connect said diaphragm assembly to said actuating mechanism, said stud including:
      (1) a flat head exteriorly of and bonded to the substantially flat center portion of the convex portion of said facing sheet,
      (2) a threaded shank integral with said head and extending through a hole in said boss.

4. A diaphragm assembly for a diaphragm valve having an actuating mechanism, said assembly comprising:
   (A) a unitary imperforate diaphragm formed of a substantially chemically inert plastic material and being of substantially uniform thickness throughout its area, said diaphragm having:
      (1) a flat peripheral portion which lies in a first plane,
      (2) a first movable central portion which lies in a second plane disposed from, but parallel to, said first plane, said first movable central portion having oppositely facing planar surfaces, and
      (3) a second movable portion which is formed with a single outwardly dished roll and which is between said flat peripheral portion and said first movable central portion, said second movable portion:
         (a) having smooth and uninterrupted oppositely facing concave and convex surfaces which merge with said oppositely facing surfaces of said first movable central portion, and
         (b) being sufficiently flexible to permit said first movable central portion to be displaced from said second plane toward said first plane and therebeyond to a position disposed from said first plane on the side thereof remote from said second plane by the application of a force on said first movable central portion,
   (B) a connecting device adapted to connect said diaphragm to said actuating mechanism, said device comprising:
      (1) a first part bonded to a surface of said second movable portion with sufficient adhering strength to apply said force in tension to said second movable central portion to cause said flexure of said second movable portion and said displacement of said first movable central portion, said first part
         (a) being at most as thin as said diaphragm in any portion of said first part which overlies and is secured to the surface of said second movable portion, and
      (2) a second part which projects outwardly from said first part and is adapted to be connected to said actuating mechanism, and
   (C) a resilient backing cushion for said diaphragm, said backing cushion
      (1) having a continuous surface which is shaped to conform to said diaphragm portions and to said connecting device first part,
      (2) having an opening therethrough to receive said connecting device, second part,
      (3) being relatively thick in comparison to said diaphragm, and said connecting device first part, and
      (4) being otherwise unconnected to said diaphragm over said first and second movable portions.

5. An assembly as set forth in claim 4 wherein
(A) said connecting device first part comprises an enlarged head portion of a stud which head portion is also bonded to the said surface of said first movable central portion, and wherein
(B) said connecting device second part comprises a threaded shank which projects outwardly from said enlarged head portion.

6. An assembly as set forth in claim 4 wherein
(A) said connecting device first part comprises:
  (1) a layer of fabric like material overlying said diaphragm and having
    (a) a central portion with an aperture therethrough and
    (b) a peripheral portion bonded to said surface of said second movable portion, and
  (2) said part further comprising an enlarged head portion of a stud which head portion is captured between said diaphragm and said fabric layer, said fabric also being bonded to the adjacent surface of said enlarged head portion, whereby said stud is secured to said diaphragm, and wherein
(B) said connecting device second part comprises a threaded shank which projects outwardly through said aperture from said enlarged head portion.

7. An assembly as set forth in claim 1 wherein
(A) said means joining comprises:
  (1) a washer-like body of resilient material having
    (a) a central opening therethrough,
    (b) a counter bored recess on one side thereof, and
    (c) an annular surface surrounding said recess and bonded to the substantially flat center portion of the convex portion, and
  (2) said stud head portion being received within said counterbored recess and resting upon said diaphragm whereby said stud is secured to said diaphragm, and wherein
(B) said threaded shank projects outwardly through said central opening from said head.

8. An assembly as set forth in claim 1 wherein
(A) said means joining comprises:
  (1) a block of resilient material bonded on one side to the substantially flat center portion of the convex portion, said block
    (a) being relatively small in area in comparison to the area of said diaphragm, and
    (b) being substantially thicker than said diaphragm, and
  (2) said stud head portion being embedded within said block whereby said stud is secured to said diaphragm, and wherein
(B) said threaded shank projects outwardly through said block from said head.

References Cited in the file of this patent
UNITED STATES PATENTS

| | | |
|---|---|---|
| 2,654,559 | Franck | Oct. 6, 1953 |
| 2,710,629 | Price | June 14, 1955 |
| 2,725,211 | Boteler | Nov. 29, 1955 |
| 2,736,680 | Kidwell | Feb. 28, 1956 |
| 2,762,394 | Hastings | Sept. 11, 1956 |